(12) United States Patent
Alvarez-Calderon (10) Patent No.: US 7,281,484 B1
(45) Date of Patent: Oct. 16, 2007

(54) MULTIMISSION TRANSONIC HULL AND HYDROFIELD

(76) Inventor: Alberto F. Alvarez-Calderon, 410 Fern Glen, La Jolla, CA (US) 92037

( * ) Notice: Subject to any disclaimer, the term of this patent is extended or adjusted under 35 U.S.C. 154(b) by 0 days.

(21) Appl. No.: 09/677,583

(22) Filed: Sep. 29, 2000

(51) Int. Cl.
*B63G 8/00* (2006.01)
*B63B 1/00* (2006.01)

(52) U.S. Cl. ..................... 114/312; 114/56.1
(58) Field of Classification Search ............. 114/312, 114/330–333, 337–339, 56.1, 126, 284–287, 114/61.26, 61.27, 61.29–63, 315, 15, 1; 441/65; 440/6
See application file for complete search history.

(56) References Cited

U.S. PATENT DOCUMENTS

| | | | | |
|---|---|---|---|---|
| 514,835 | A * | 2/1894 | Mills | 114/56 |
| 806,223 | A * | 12/1905 | Wheless | 114/312 |
| 1,154,215 | A * | 9/1915 | Spear | 114/312 |
| 2,444,332 | A * | 6/1948 | Briggs et al. | |
| 2,929,346 | A * | 3/1960 | Perce | 114/312 |
| 2,937,608 | A * | 5/1960 | Vandersteel | 114/126 |
| 3,416,478 | A * | 12/1968 | Markham | 114/315 |
| 3,613,097 | A * | 10/1971 | Daughenbaugh | 342/10 |
| 3,628,484 | A * | 12/1971 | Banner | 114/285 |
| 3,902,207 | A * | 9/1975 | Timkler et al. | 441/74 |
| 4,273,063 | A * | 6/1981 | Berne | 114/126 |
| 4,668,195 | A * | 5/1987 | Smith | 440/6 |
| 5,237,952 | A * | 8/1993 | Rowe | 114/332 |
| 5,417,597 | A * | 5/1995 | Levedahl | 440/6 |
| 5,632,221 | A * | 5/1997 | Trenne et al. | 114/344 |
| 5,673,645 | A * | 10/1997 | Bandyopadhyay | 114/312 |
| 6,038,995 | A * | 3/2000 | Karafiath et al. | 114/271 |
| 6,159,058 | A * | 12/2000 | Matheson | 440/12.5 |

FOREIGN PATENT DOCUMENTS

JP          362071792 A  *  4/1987

* cited by examiner

*Primary Examiner*—Ed Swinehart
(74) *Attorney, Agent, or Firm*—Adam H. Jacobs

(57) ABSTRACT

A transonic hull having a bow, a stern, a longitudinal length therebetween, side surfaces extending from the bow to outboard portions of the stern, a lower surface extending between the side surfaces, the transonic hull having a submerged volume with an approximately triangular shape in plan view with apex adjacent the bow and a base adjacent the stern, and an approximately triangular shape in side view when in motion with a base adjacent the bow and an apex adjacent the stern.

12 Claims, 3 Drawing Sheets

MULTIMISSION TRANSONIC HULL AND HYDROFIELD

CROSS REFERENCE TO RELATED APPLICATIONS

Sections 1 to 14 of Provisional Application 60/015,704 of Mar. 13, 1996 pertains to patent application Ser. No. 08/814,418 filed Mar. 11, 1997. These documents specify the shape of the submerged portion of the transonic hull (TH), for example, FIGS. 13 and 14 of that Application. The corresponding high speed hydrodynamic regimes in displacement mode identified as $\underline{TH}$ are shown in FIGS. 14c, d, h, and I. The above Applications also indicate that TH pertains to submersibles (line 3 of section (e) of Specifications).

Sections 15 to 18 of Provisional Application 60/015,704 of Mar. 13, 1996 pertains to patent application Ser. No. 08/814,417. Hence, patent application Ser. No. 08/814,417 is a technical continuation of application Ser. No. 08/814,418, including sequence of numbers of section and of figures in the original application. The Patent Office, however, required that the section and figure numbers of application Ser. No. 08/814,417 should be amended to begin with FIG. 1, and also requested a rearrangement of headings of sections. Accordingly, application Ser. No. 08/814,417 was amended as requested with deletions of many figures to simplify the case. In the amended application original FIG. 37 was retained and renumbered as FIG. 3 without being changed and referred to in the mended text as in the original, "for special military applications."

Notwithstanding compliance with the above, the Patent Office further requested that the amended specifications be refiled as CIP with a Petition for CIP under CFR 1.53e. This was done on Dec. 28, 1999 via FAX and first class mail with an additional fee of $130 paid with check 105 of Union Bank of California. No response has been received on applicant's petition for CIP. However, since applicant's inventions, and past and on-going proprietary R & D work need to be protected, there is hereby filed a direct CIP of application Ser. No. 08/814,417, independent of the Petition for CIP.

The present application pertains to special subsurface and surface capability of unique embodiment of the Transonic Hull TH and Transonic Hydrofield $\underline{TH}$, which was first disclosed at the Patent Office as original FIG. 37 in the provisional application 60/015,7004 of Mar. 13, 1996 as well as FIG. 37 in original application Ser. No. 08/814,417. That figure was renumbered as FIG. 3 in the Petition for CIP filed Dec. 28, 1999. To avoid confusion, it is also numbered FIG. 3 in the present CIP. The experimental success of subsurface operation of TH/$\underline{TH}$ was mentioned to Examiner E. Swinehart in applicant's interview of August 1999.

Figure 3:
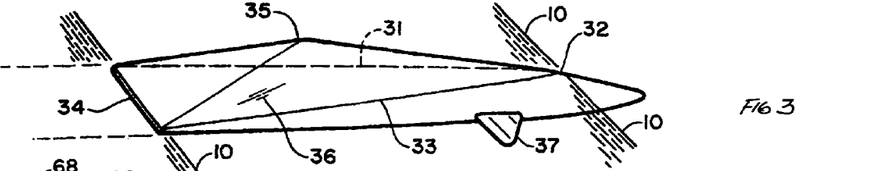
FIGS. 3, 4A, and 4B correspond to FIGS. 37, 30A and 30B as originally filed in application Ser. No. 08/814,417 and correspond to FIGS. 3, 4A and 4B in the Petitions for CIP on application Ser. No. 08/814,417, requested Dec. 28, 1999.

The present CIP includes original FIG. 37, now FIG. 3, and covers the design of TH/$\underline{TH}$ for a subsurface hydrodynamic regime which also functions in different at-surface hydrodynamic regime. Because of this double requirement, it is bi-hydro multimission TH vehicle. TH-MM referred to as TH-MM, where MM denotes multimission capability. TH-MM has also special air drop and amphibian beaching capabilities.

STATEMENT OF FEDERAL SPONSORS

NOT APPLICABLE

MICROFICHE

NOT APPLICABLE

BACKGROUND OF INVENTION

1. Field of Invention

The multimission capability of TH-MM is related generally to surface ship and boats, and to subsurface vehicles which can operate successfully as a displacement and/or transplanar surface regimes, as well as a winged vehicle capable of subsurface operation though sustained downward hydrodynamic forces on its wings at design submerged operational speeds. The multimission also covers air drop into water directly into submerged operation, and amphibious water/beach operations.

2. Description of Related Art

Figures 1A, 1B, 2:
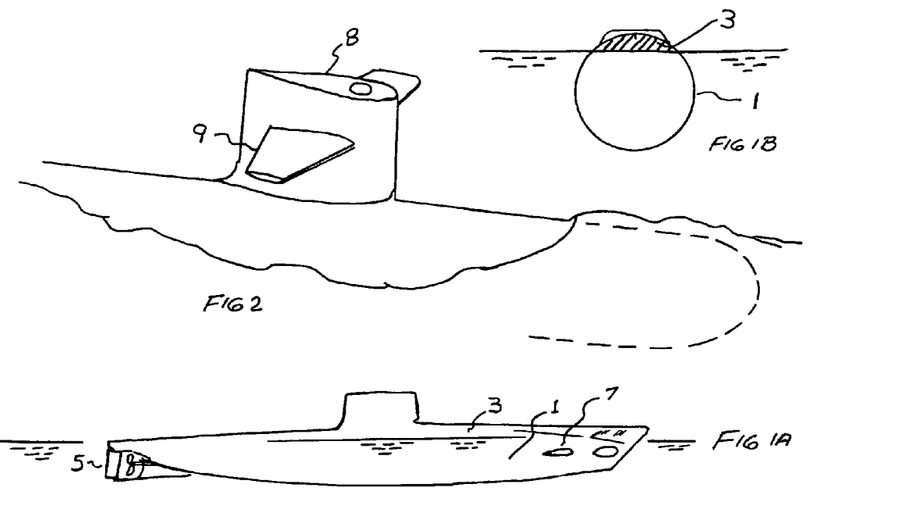

Given the broad scope of the invention, a description of related art covers the following:

Subsurface Vessels (a) Submarine is a vessel such as shown in FIG. 1A, supported on surface by buoyant forces with small buoyancy reserve on surface such as shaded area 3 in FIG. 1B. Descent and climb is controlled by adding or removing water ballast. Additional control is provided by external foils such as rear rudder in yaw, and forward horizontal foils 7 in pitch. the submarine is autonomous, capable of operating at the surface of the water in displacement mode but, in order to facilitate diving, its reserve buoyancy is minimal compared to surface ships and boats. Submarines can descend to large depths. Consequently, it must use circular structural cross-section such as in FIG. 1B to resist great compressive forces at depth. Submerged, but near surface it can ingest air by a retractable vertical tube called Schnorkel, unless nuclear powered (not requiring air for engine).

The ration of submarine weight to total displacement of its shape approaches 1 at surface and is substantially 1 when submerged.

The weight-to-drag ratio of a deeply submerged submarine can be high compared to surface ships at the same speed and weight, because when deeply submerged, it does not generate surface waves. Nuclear submarines have no practical restrictions on range and endurance. Their weight-to-drag ratio when operating at (or near) the surface, however, is not favorable due to great surface disturbance they create, as can be seen in FIG. 2 taken from published photographs of submarines at speed at the surface.

(b) Semi-submarine have been proposed as transport ships when a permanent submerged displacement volume and a surface-piercing strut for permanent fresh air breathing, allowing the use of internal combustion engines and increasing crew comfort. It is claimed to have favorable lift-to-drag ratio and favorable sea-keeping characteristics in certain sea conditions, compared to surface ships, for example as described in a paper by MIT's Professor Mandel's examining several novel ship types.

(c) Submersible is generally understood to be a subsurface vessel having a limited structural and operational subsurface capability. It is capable of surface actions such as firing guns and torpedoes. As designed in the past they had limited subsurface speed and range, for example, the earliest submersibles of the first World War.

(d) Swaths are multihulls with submerged displacement volume.

Subsurface Vessels

The present invention is also related in its surface operation to Transonic Hull and Transonic Hydrofield of patent application Ser. Nos. 08/814,418 and 08/814,417. It may also relate to art cited by Patent Office, and by applicant, in pursuit of application Ser. No. 08/814,418. However, the present application in its multimission bi-hydro substance, is not related to the above art.

(F) BRIEF DESCRIPTION OF INVENTION (TO BE MADE)

(G) Brief Description of Drawings

FIGS. 1A. 1B and 2 are old art of submarines.

(H) DETAILED DESCRIPTION OF INVENTION

1. Introduction. For reasons that may become evident in the following review, the scope of the present TH-MM invention can be better understood by firstly considering aircraft, and then ships and boats.

(a) There are two basic types of aircraft:

Heavier-than-air winged craft which derive lift to equilibrate total weight by change of momentum of air flow, which completely surrounds the winds and tail.

Lighter-than-aircraft, for example, the dirigible, which uses buoyant forces of lighter-than-air gases to equilibrate total weight, with control provided by small foils. Again the craft is totally surrounded by air. Dirigible can climb by releasing ballast and descends by releasing gas or by other means, such as compressing and decompressing gas.

The lift/drag ratio of the dirigible is high at low to medium speeds, because it has no lift-induced drag, but payload and speed are limited. The aircraft is faster with a lower L/D and higher payload fraction. it is also less dependent on adverse weather.

(b) There also are two basic types of water supported vessels:

Subsurface vessels, for example, the submarine such as in FIG. 1. When submerged, it is analogous to the dirigible: buoyant forces equilibrate total weight and there is no lift-induced drag. Dive and ascent is controlled by intake and expulsion of water weight into and out of ballast tanks. Like the dirigible, maneuver are accomplished with small foils, at the fore an aft ends of the submarine, such as 5 and 7 in FIG. 1A, or trim with midbody foil such as 9 in FIG. 2. Also, like the dirigible, the submarine when submerged has high lift/drag ratios.

Surface vessel, for example, displacement ships, in which buoyant lift from a small portion of the total volume of the ship equilibrates total weight. Another example is the planing boat, in which dynamic lift forces equilibrate most of the total weight. But surface vessels, unlike aircraft, are not completely surrounded by water fluid, but operate at the interface between air and water, i.e. water-surface interface. Nevertheless, surface vessels have volumetric or lift-induced drag, and their L/D are lower than a submarine, although their speed regime in semi-displacement or planing modes can be higher than a submarine, due to large decrease of wetted area and viscous drag.

When the submarine operates very near surface, or at the surface, it really is in an off-design condition, and it becomes an inefficient hybrid, because its shape is optimized, structurally and hydrodynamically, to operate submerged at some depth. The surface waves it generates create wave-making drag. Those generated by a modern submarine operating at surface level are very large, as can be seen in FIG. 2, taken from published photos.

Indeed, there are several design features inherent in the submarine which penalize its operation at the surface. For example:

Use of circular structural sections to withstand large hydrostatic compression forces when submerged, a shape also used in semi-submarines, swath bodies, and submersibles. This shape penalizes speed at the surface and has a very large radar cross-section. Also its large wake is immediately observable.

Use of minimal reserve buoyancy when floating or moving at the surface, to minimize the volume and time needed to introduce water ballast to dive. This results in cramped space in the submarine, and, moreover, it requires a tower or "sail" 8 in FIG. 2 for people's access at surface level, which is highly visible and also narrow.

In consequence of the above, the potential speed, L/D, and fuel efficiency of a submarine at surface level is limited, its detectability by radar or visual means is large, and its utility as a surface vessel is extremely limited. On the other hand, its depth of submerge is very large, it is a dangerous attack vessel, and its submerged L/D is favorable.

The submarine has been, historically, a military vessel with a cruel and sacrificed role in two world wars. During the subsequent Cold War, submarines were developed for strategic long range role with nuclear power, and nuclear weapons. Special circular shapes and materials were developed, and drag and silent propulsion improved with refinements in hydrodynamics.

Following the Cold War, the role and need of nuclear powered and nuclear armed submarines is not as critical. Moreover, new requirements and missions have arisen related to activities in littoral and fluvial waters, also known as coastal and riverine waters. Examples of these missions are interdiction of drug traffic, of weapon smuggling, and of insertion and removal of anti-terrorist forces, which can be carried out by military organizations. Many of these missions could be performed by surface craft due to high speed and maneuverability, but at considerable risk, since they are easily detected by radar and other means and can be attacked by missiles. The submarine could also perform some of these missions, except that in its current form, it is too large and expensive and cannot operate in coastal waters of low depth. Moreover, its surface capabilities are limited in speed, maneuverability, and high detectability.

A new type of water vehicle is needed which is capable of operating efficiently on surface with high speed and with low radar cross-section, and which is also capable of submerging promptly to evade a missile, and of sustained submerged operations in coastal water and rivers. Additional mission flexibility is also needed, such as air drop directly to submerged operation, and emerge from below water to beaches and return.

Summarizing, this new type of vehicle is a TH multimission vehicle, the TH-MM, having two basic hydrodynamic regimes: subsurface and surface operations. This is the subject of the present invention.

2. Objective of TH-MM. The present invention specifies a new type of water-sustained vehicle with at-surface and subsurface capabilities, with design features meeting two or more of the following features:

Operation as a surface vessel with low weight, with special buoyancy reserves, with high speed capability, and with high efficiency.

Accordingly, at surface TH-MM can have many features of TH/TH, including operation at subcritical and supercritical regimes, and other new regimes defined, as hypercritical, transplanar and x-regimes, to be defined by means of another CIP.

Operating as fully submerged vessel not using water ballast, but hydrodynamic wings instead, to provide downward forces when submerged which counter the lifting buoyant forces generated by the submerged special buoyancy reserve.

A TH-MM capable of transitioning from surface to submerged condition rapidly to avoid missiles without need to take water ballast, and to maneuver submerged, and emerge to the surface, with hydrodynamic wings and flap-type elevator on the vehicle's stern, and with a control system similar to the elevator on the tail of a winged aircraft in flight, except that hydrodynamic wing "lift" is downward.

Accomplish transition between surface and submerged operation with minimal wake.

Achieve motion on surface with minimum wake and minimum generation of white water and turbulence.

Shape the surfaces of the vessel above water to have low detectability by radar, and by visual, thermal and acoustic devices.

Shape the undersurface of the vessel below water to have low detectability from sonar, and other devices, and minimize hydro noise.

Design the wings which permit subsurface operation of the TH-MM to also enable on surface motion riding on the wings, generating upward lift, to reduce wetted surface above water level.

Shape the vehicle to permit air drop from transport aircraft into a water body bow first, with smooth immersion and transition to sustained submerged motion, including a parachute-arrested descent, and entry with propulsive device already activated.

Power the vehicle with rotary water impellers placed to counteract vortex formation at the vehicle's stern, at least when operating at surface.

Shape the TH-MM to have wedge shaped ends, the forward one with its sharp edge vertical, and the rear one horizontal.

Structure the vehicle so its relatively flat ends are adapted to be permeable to water to prevent collapse of its surfaces at depth, and/or to settle the TH-MM on bottom of shallow waters, restricting the dry portion of the submerged vehicle to a central body region capable of supporting compressive forces from external water pressure with internal curved structures.

Shape and control the vehicle to permit successful operation in surf zones by diving below breakers and steep waves.

Design the TH-MM and its propulsion to permit slow submerged motion towards an adequate beach.

Provide vehicle design and features that are compatible with transportation, launch, and retrieval from larger vessels including conventional submarines, patrol boats, and aircraft, with the winds of the TH-MM being movable to stowed positions to minimize overall stowed dimension.

Provide an amphibian capability for the vehicle by equipping it with at least three wheels or treads, which are preferably retracted except when beaching.

Two or more of the objectives above are met in the various embodiments of the invention specified below.

3. TH-MM for Special Military Applications.

Figure 4A:
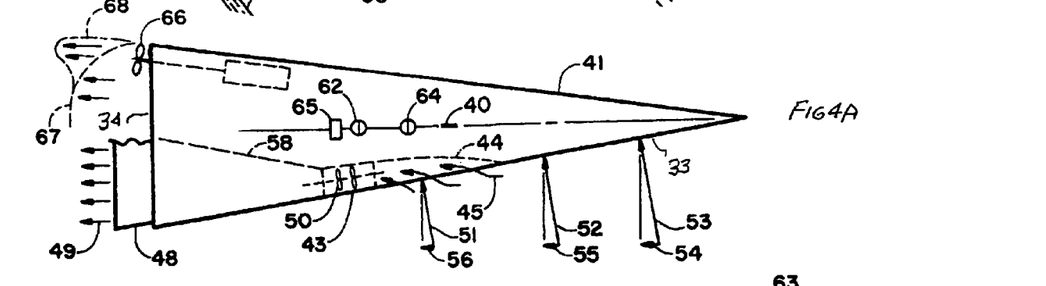
Figure 4B:
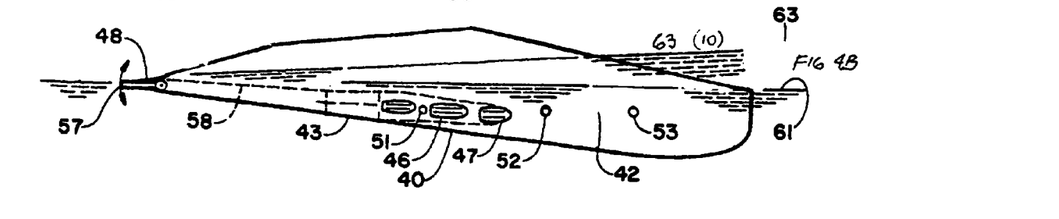

This is a vehicle capable of surface operation and of subsurface operation. FIG. 3 shows the at surface operation of TH-MM, having a submerged volume portion below water level 10—10 in FIG. 3. Its waterplane shape is shown in FIG. 4A. Alternatives to the profile are shown in FIG. 4B.

In FIG. 3 there is shown a generally triangular waterplane having sides 31 and 33, apex 32 and base 34. Moreover, above the water level 10—10, there is shown a unique shape also of special interest for military applications: a unique triangular shape in side view with apex at 35, and a profile's long triangular base between waterplane's apex 32 and base 34, hence the base is at waterplane level. As shown in FIG. 3, there are also triangular side surfaces above waterplane, such as right side 36, is inwardly inclined above the waterplane. An important military benefit is that only three faceted flat surface project above water, and, therefore, its radar detectability is minimal. The control is provided in pitch and heave by the wings, such as right wing 3 adjacent midbody. The left wing 3 is not visible in the drawing. Roll can be made by differential wing angles. Other controls for the vehicle of FIG. 3 are shown in FIGS. 4A and 4B, and will be reviewed in greater detail in relation to FIG. 5.

4. Propulsion for TH-MM.

FIG. 4A also shows a TH-MM vehicle having a bottom surface 40, left side 41, and right side 42. Adjacent level of 40, inside TH-MM and on its right side there is mounted water jet turbine with an intake channel or duct 44 into which water flows for water jet engine 43, for example, water arrow 44 through intakes orifices 46 and 47 in FIG. 4B.

The exit duct or channel 58 for the water jet engine changes from circular section at the water jet, to a rectangular or trapezoidal section at exit flap 48, with the corresponding exit streamline 49 having higher pressure than at intake 45, by reason of the work done on the internal flow by the impeller 50 in water jet 43. The pressure difference across the impeller normally provide, at its shaft, the propulsive thrust TI generated by the water jet engine, where I denotes the impeller source of thrust.

However, water jet propulsion for TH-MM as shown in FIGS. 4A and 4B provide additional unique propulsive benefits formulated by this writer, explained below.

The intake flow 45 lowers the local pressure, which propagates forward such that a drop of pressure appears on the lower sides of TH-MM, for example, by pressure vectors 53, 52, and 51, which decrease in magnitude as the intake is approximated. As a consequence, the pressure drag component on the sides of TH-MM also decreases from 54 to 55 to 56 in FIG. 4A, to a lower value than would be the case without a lateral intake 46 and 47 in FIG. 4B. In consequence, the pressure drag of the sides of TH-MM decreases, resulting in an equivalent incremental thrust ATP, where P denotes the pressure origin of the thrust gain.

Another incremental thrust occurs by the controllable hollow flap 48, which guides the high pressure water jet exhaust in a water sheet of width approximately equal to maximum local beam, as shown in FIG. 4A which by the extensive exposure to undersurface flow adjacent the stern, generates by entrainment a thrust augmentation ΔTE, where E denotes the entrainment origin of the gain.

The adjustability of the angel of flap 48, ∞F, shown as 57 in FIG. 4B, permits optimization of discharge direction of flow 49, compared to a fixed exit angle, for an extra gain of thrust ΔT∞F, where ∞F denotes the flap angle origin of the gain.

The high energy wake from the flap expands across the stern leading to a separate thrust augmentation by smoothing out a subcritical wake of TH-MM which results in a thrust increment ΔTw, where w denotes the wake improvement origin of the gain.

Thus, the total thrust TT on the right side of FIG. 30 is:

$$TT = TI + \Delta Tp + \Delta TE \neq \Delta T\infty F + \Delta Tw$$

The thrust penalty of the above system, namely, a part of the internal friction in duct 58 and/or 44, −ΔTD, is smaller than the sum of the gains.

FIGS. 4A and 4B also show another unique feature of TH-BH, namely, its ability to increase cargo and decrease reserve buoyancy to favor submerged operation, adding draft at bow with constant optimum draft at stern, with or without stern flap. At reduced cargo, the waterplane is at 61 at the bow in FIG. 4B, with center of gravity CG and Center of Buoyancy CB at 62. At heavier cargo, waterplane is at 63, with CG and CB at 64. Unlike conventional hulls, the centroid of waterplane of area 65 in TH-MM is significantly behind CB. Hence, a stable pitch situation exists in pitch dynamics, increasing in pitch damping as the weight is increased and CB moved forward. Flap 48 is adjusted to remain as shown approximately parallel to the waterplane.

An alternative propeller propulsion is shown at left of FIG. 4A, with the propeller adjacent the rear corner in planview of the TH waterplane. Two special forms of hydrodynamic cooperation are thus provided.

The left propeller 66 has counter rotation (CR) relative to the vortex rotation tendency associated with the left submerged corner of TH-MM, leading to a thrust gain ΔTCR., where CR denotes the counter rotation origin of the gain.

The local propeller slipstream improves the Gothic wake GW 67 at subcritical speeds of TH-MM decreasing wake drag as symbolized in 67 with ho propeller and 68 with propeller, leading to a thrust increase ΔTW, where W denotes the wake improvement which originated the gain.

Another important feature of the propulsion systems reviewed above are the reduction of visibility of wake, which is obtained by appropriate discharge of high energy propulsive flow in combination with the broad stern of the triangular planform of TH-MM, and the reduced adverse effects of the boundary layer on the undersurface, specially for propeller 66 which has very short undersurface length upstream of that propeller.

5. Hydrodynamic Regimes for TH-MM.

The TH-MM has two fundamentally different hydrodynamic regimes.

(a) At surface, it operates in the subcritical and supercritical regimes defined in application Ser. No. 08/814,418 and its CIP's, inclusive the hypercritical, transplanar and x-regimes defined in another CIP.

(b) Subsurface, with its wings and tail-like stern, it is fully surrounded by water and is shaped to have fully attached flows, with wings and control surfaces designed with aircraft-related theory, but with different criteria for stability, control, and handling qualities. Also, the center of gravity, and hydrodynamic center for wings are different in functions, as will be shown in FIG. 5, with due allowance for the differences which high water density, compared to air, imply.

(c) Transient surface-subsurface-surface: This is a very important regime, in which rapidity of immersion, and low wake during immersion, are of critical importance, for example to avoid an oncoming missile. The polygonal cross-section of TH-MM such as in FIG. 3, and others to be reviewed later on are of considerable hydrodynamic value towards these goals, as is specified also in FIG. 5.

6. Design and Tests of TH-MM for Advanced Missions.

FIG. 3 has shown in isometric view the archetype of TH-MM which establishes the upper body shape for submerged operations, as well as at-surface operation and transition mode. FIG. 4A has shown its waterplane, a trailing flap, and disposition of powerplants. FIG. 4B has shown principal power plant intakes, and alternative profile features, including a flap which can be independent of the propulsion system.

To accommodate more volume for greater payload than in FIG. 3, and to more extensively describe the cooperation between wings of FIG. 3 and flaps of FIGS. 4A and 4B in aeronautical terms for maneuvering TH-MM submerged on same principles as an winged aircraft in the air, but with modifications as wing lift does not oppose gravity forces, there is shown in FIG. 5 a more detailed advanced embodiment of TH-MM having greater submerged volume with a narrower submerged beam, while retaining a faceted body above water when operating in its at-surface regime.

Specifically, FIGS. 5A to 5E show a multimission multi-hydro TH-MM. embodiment which has been successfully tested to operate in three basic hydrodynamic regimes: At-surface, subsurface, and transient between surface and subsurface.

Figures 5A, 5B, 5C, 5D, 5E:
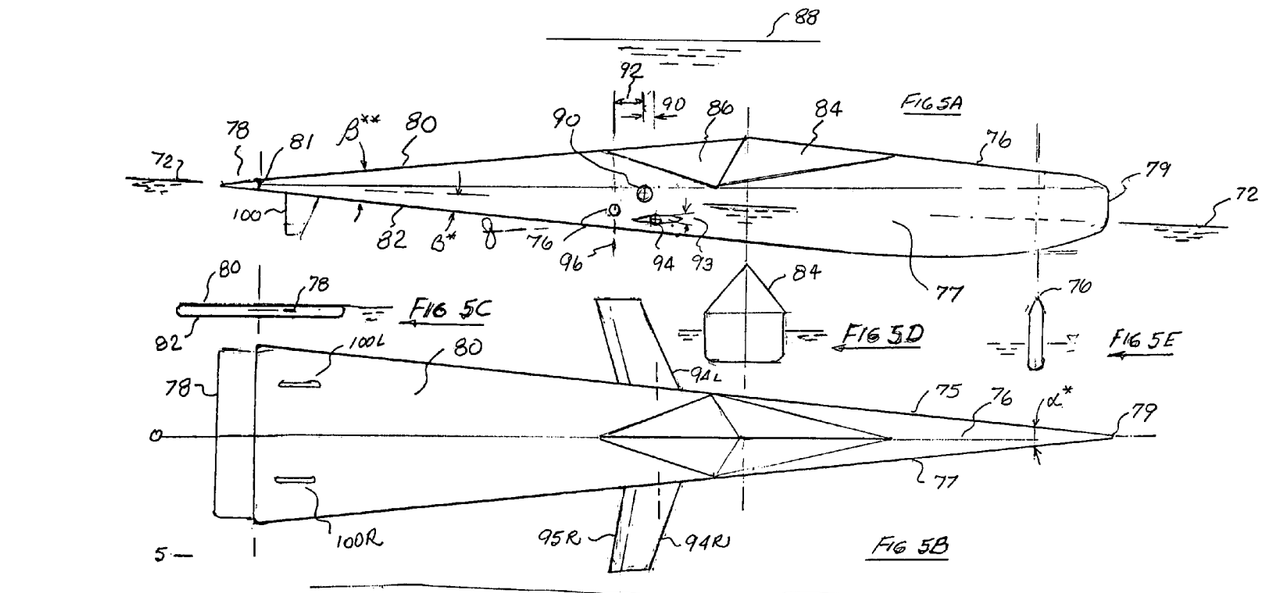
FIGS. 5A to 5F pertain to an advanced TH-MM tested by the writer.

FIG. 5A shows in side view an MM hull 70 floating static in water level 72 with a submerged profile 74 and an above-surface triangular profile 76, which has low radar signature. The center of gravity is shown at 76 which corresponds to the at-surface center of buoyancy. A flap-type elevator 78 is shown at the trailing edge of the airfoil-like rear profile of the MM hull, having a wedge-like upper and lower rearward hull surfaces 80 and 82, tapering in side view to the flap. The exit angle between water plane 72 and undersurface 82 is B*, and included angle between 82 and 80 is B**. Windows for visibility at surface and submerged are 84 forwardly and 86 rearwardly. Approximate longitudinal dimensional scale is shown on top of the page, in units which can be feet, meters, or multiples thereof.

In the submerged condition water level is shown at 88. When submerged, the center of buoyancy shift to 90 by a distance of 92. The wings are shown with a hydrodynamic axis 94, at a distance 96 from the CG. A pair of rudder are shown as 100L and 100R.

FIG. 5B shows the triangular planform of MM hull having right side 77 and left sides 75 meeting at approximately vertical leading edge 79 defining an entry angle alpha*. At midbody there is shown right wing panel 94R, left wing panel 94L, and Hydrodynamic wing axis 94 equivalent to a wing aerodynamic axis. At the stern there is an approximately rectilinear trailing edge of the MM hull on which is mounted trailing flap 78, which acts as an elevator control on the body and wings. Also there is shown location of rudder 100L and 100R.

To further clarify MM's shape, 5C shows the cross-section of MM hull at its trailing edge 81, having a thin horizontal contour. FIG. 5E shows the cross-section adjacent the leading edge 79 with a thin vertical contour. Finally, FIG. 5D shows the cross-section at a mid body station where most of the volume for payload is located.

The TH-MM has general shape envelopes by which angle B* can be less than or up to alpha*, and B** can be from approximately alpha* to three times alpha*.

The range of hydrodynamic forces which the wings can generate depends on the area $S_w$, lift coefficient $C_L$ (a function of angle of attack alpha and dynamic pressure q, which in turn is a function of dive speed $V_D$ and submerged speed $V_S$.

The buoyancy reserve above static waterplane 72 is capable of generating, if submerged, an additional lift $L_{BR}$. It must be countered and canceled by the wing's down force on area $S_w$, defined as follows for vertical equilibrium:

$$L_{BR} = C_L q S_w$$

whence $S_w = L_{BR}/C_L q$

The $C_L$ range is a designer's choice in the range of 0.3 to about 1.5 with an unflapped wing or up to about 2.5 if wing flaps are used on the wings, such as 95R and 95L. The reason for the wide range of $C_L$ are:

The need to meet various speeds for various conditions, such as dive, surface, cruise submerged, and even raise the MM hull above water.

There is an additional equation for pitch equilibrium that has to be satisfied simultaneously with vertical equilibrium.

It is seen in FIGS. 5A to 5E that the three dimensional shape of TH-MM comprises:

(a) A wedge shaped forward end portion with sharp edge forward and in a vertical orientation, and an included angle of alpha* in planform (b) A wedge shaped rearward end portion with a sharp edge rearward and in a horizontal orientation with included angles in profile of B* at surface and B** submerged.

(c) A mid body portion having principal volume, with a local beam substantially less than the beam at the stern.

(d) A relation between the angels alpha*, B*, and B**.

This type of elongated slim body allows for easy dive for submergence, low wake when submerged very near surface, inherent pitch stability when submerged, no need for horizontal tail in presence of wings, downward rudders that are effective, good visibility forward and aft, and stealth at surface and submerged.

This same hull shape when operating at the surface can do so at TH's subcritical and supercritical hydrofields, and the faster hypercritical, tansplanar and x-regimes to be defined in a separate CIP.

In FIGS. 5A and 5B, pitch is controlled by elevator 78, heave for sink or climb by angle 93 symmetrically on right and left wings relative to the flow, roll by asymmetric use of angle 93, and coordinated turns at surface or submerged with coordinated rudder and ailerons or asymmetric wing angles. For example, a right turn requires the trailing edge of rudders to move to the right seen from above, the trailing edge of right wing upwards, and the trailing edge of left wing downwards.

7. TH-MM for Submerged Passive Surveillance.

Figures 5F, 6A, 6B, 7:
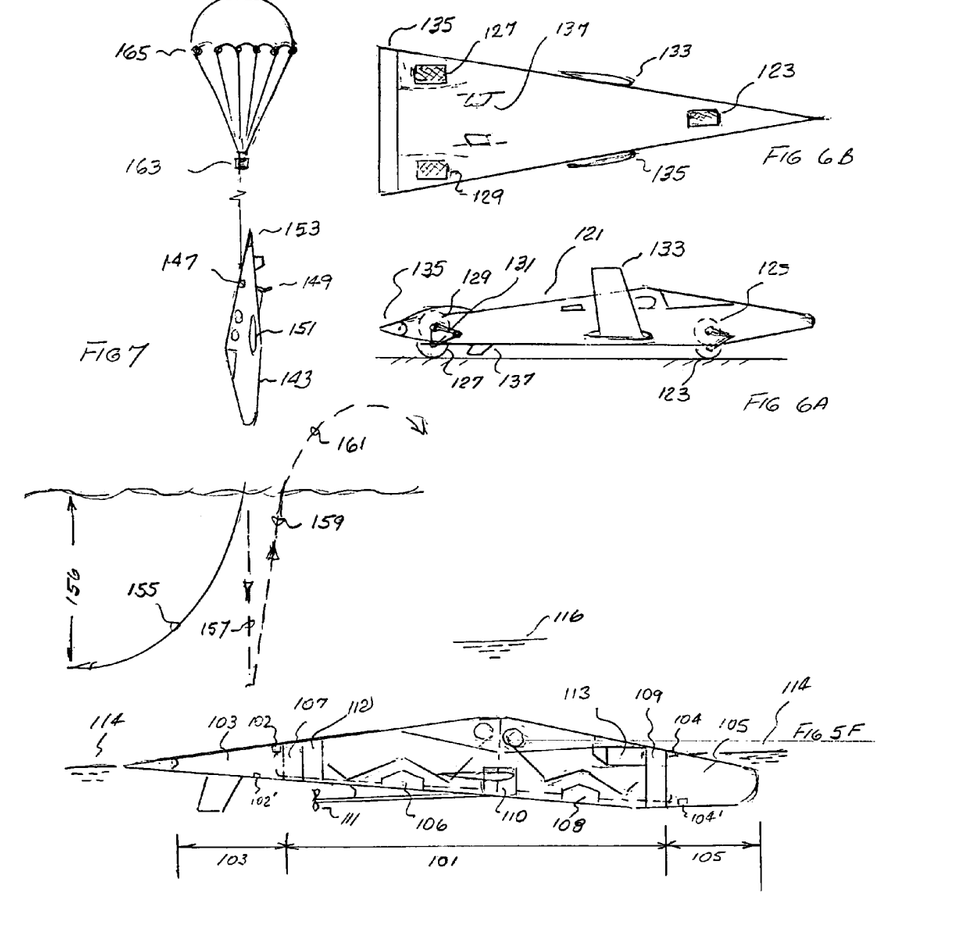
FIGS. 6A and 6B pertain to an amphibian TH-MM.
FIG. 7 shows TH-MM for air drop.

FIG. 5F shows an arrangement of 5A in which once submerged rapidly by action of the wings, the rear and forward portions 103 and 105 of TH-MM can be flooded by opening valves 102 and 104 to slowly settle the MM hull on a shallow floor in a stationary passive surveillance status. It should be noted that pre-compressed air in air tank 106 and 108 can be used to evacuate the flooded water compartments, by valves 102' and 104' but failing that due to damage, the wings under forward speed could easily raise the TH-MM vehicle to the surface, in which case a manual pump could easily evacuate the flooded compartments curing forward motion at the water's surface.

The TH-MM of FIG. 5F uses a mixed propulsion system with batteries 107 and 109 powering its submerged motion, and an air breathing motor 110 and propeller 111 using fuel from fuel tanks 112 and 113 for surface operation, which also charges the batteries, and stores compressed air. Alternatives power systems using fuel cells, lithium or hydrogen systems, or other energy sources can be used.

FIG. 5F also shows that in a small size craft, three persons can fit in its dry section, two facing back and one forward within a cabin's trapezoidal floor plan within the triangular planform shape of the hulls planform.

In FIG. 5F, the hull is divided in three basic sections: Rear portion 103 which can be flooded, mid portion 101 which is dry, and forward portion 105 which can be flooded. For surface operations, the end regions are dry and water level is at 114. When 103 and 105 are flooded, the boat settles on the floor of a shallow water body, for example, to carry out passive surveillance.

Another advantage of end portions 103 and 105 is that they can be flooded to avoid compression forces when diving to depths that otherwise would require circular cross-section. Finally, portions 103 and 105 can be filled, while at surface, with external air, or oxygen, for prolonged subsurface operation.

An alternative to flooding tanks 103 and 105 is to equip the craft with self-attaching "anchors" which can be fired downwards, with a cable trailing to the craft, to penetrate the floor of the water body, then the craft could roll in the cable to hold the craft immobile adjacent the floor.

Returning to earlier text of the specification, the statement made that aerodynamic theory and design criteria can be applied to subsurface TH-MM. This has to be qualified with three important and fundamental changes:

(a) The relations between gravity forces and on wings forces is entirely different:

In an aircraft the wing lift opposes vehicle weight.

In a TH-MM submerged wing lift adds to vehicle weight.

(b) Virtual mass in accelerated motion is not significant in aircraft and is important for submerged or surface vessel. Its effect on time response of the vehicle permits design criteria not viable for aircraft.

(c) The water air interface in aircraft provides favorable "ground effect;" in surfacing TH-MM, it provides adverse "wave making" effect.

In consequence of the reversal of role of the wing forces (item a.), the longitudinal stability and trim parameters of TH-MM are not operable in the same sense as in aircraft. Hence, good test results were obtained with wing's downward lift vector ahead of the vehicles mass CG by a first relatively large distance, and also ahead of the submerged CB by a second but much smaller distance. The first distance on an aircraft configured as TH-MM of FIG. 5 would be inadvisable with a "tailless" fuselage shaped as the body of the TH-MM, as it would be divergent in pitch and untrimable as well.

In respect to the second distance, there is a very peculiar situation in which safety is ultimately improved by having the hydrodynamic axis of the wing ahead of the submerged CB.

Another important benefit of having the submerged CB ahead of the vehicle's CG is that in case of propulsion failure when submerged, the positive buoyant forces on the submerged TH-mm will cause a pitch up as upward motion is gained with path control by stern flap. In the contrary case, an uncontrolled tail first rising would occur, which would not permit successful use of the tail's elevator for path control.

8. Amphibian TH-MM and Folding Wings

FIG. 6A shows the side view of an amphibian version of TH-MM. Hull 121 is equipped with a retractable tricycle wheel suspension. Deployed forward wheel 123 can be retracted to position 125, wheel 123 can be steerable. At the rear are right wheel 127 which can be retracted to position 129. Bottom view of the tricycle arrangement is shown in FIG. 6B with left wheel 129, as well as wheels 127 and 123. Each of the rear wheel is powered, with electric motors mounted, for example, on adjacent trailing arms which hold the wheels, such as arm 131. Differential power of right and left rear wheel can also steer the vehicle on land, with a castering front wheel, which could also be powered.

FIGS. 6A and 6B also show right and left wings 133 and 135, respectively, folded upwards for two purposes: Reduce overall span or width of vehicle during ground operation, and reduce water resistance when in at-surface operation in the transonic and higher speed regimes. Hydrodynamic controls include elevator 135, an folding rudders 137, which are shown unfolded in FIG. 6a and folded in FIG. 6B.

The upward folding of wings 133 and 135 apply also to FIGS. 5 and 3, but were not shown thereon for purpose of clarity of drawing.

9. TH-MM for Air-Drop to Water Bodies

FIG. 7 shows an airdrop of TH-MM into water body 141. Specifically TH-MM 143 is descending after drop from an aircraft (not shown) at a rate of descent in air $V_{RD}$ established by deployed parachute 145. Shortly before water contact, or upon contact, parachute 145 is released by release device 147, and water propeller 149 is powered at high level, with wings 151 and elevators 153 set for submerged slight pitch-up trim at water speed $V_{RD}$. Under effect of propeller 149 entering the water, the subsurface path 155 of TH-MM will be developed with smooth entry and gradual deceleration, as has been verified directly by free vertical drop from selected heights of models of TH-MM, and also by encounters of TH-MM in high speed surface mode near vertical large waves which are penetrated successfully.

Failure to apply marine propeller power, (or alternative water jet power), upon contact with water 141, will result in an adverse vehicle path 157 bow first, leading to full stoppage, and reversal path towards surface tail first along water path 159 including leap 161 in the air, tail first. Accelerations of these paths are high and undesirable. Also an on-surface floating presence at end of 161 is detectable visually, and perhaps by radar.

Hence the needed power and trim levels before or at contact is the on-design requirement for a successful air drop. Successful model drops have been performed with successful subsurface path 155 at model air drop speeds corresponding speed/length ratio upon contact of approximately 10 and 14 with tolerable decelerations and radius of pull out 156. For a TH-MM having 100 feet length, the air descent speed with a speed/length ratio of 10 would result in a vertical contact speed of 100 knots. If the final submerged speed were 50 knots, the deceleration would be 50 knots, or 84 feet/sec. Assigning 3 seconds of decelerating time at uniform deceleration rate, the average deceleration would be less than 1 G, tolerable for trained crews. The peaks maybe higher than the assumed average. However, the maximum subsurface speed can be governed by power, and the contact speed reduced by larger or more numerous parachutes. The centrifugal acceleration during submerged pullout should be no larger than 3–6 G's.

The released parachute has distributed weights 163 and 165 that should sink parachute promptly so no trace of entry is left on water surface 141 a few seconds after contact.

10. TH-MM for Landing, Evacuating, and Rescue in Large Surf

Figures 8A, 8B:
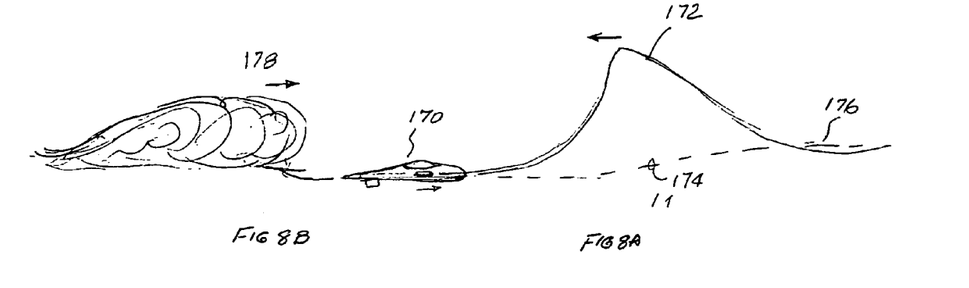
FIGS. 8A and 8B show TH-MM for surf operation.
Figure 9:
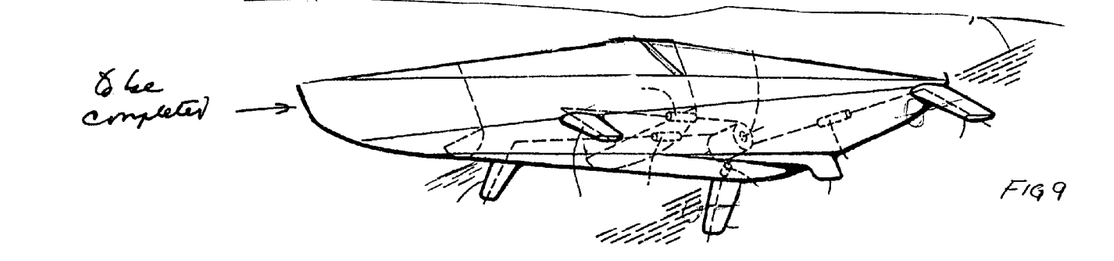
FIG. 9 shows TH-MM for multiwing above surface, surface, subsurface and multifunctional operation.

FIG. 8 shows another special capability of TH-MM: It can successfully perform covert landings, or rescue missions, in enormous seas and surf relative to size of TH-MM. Specifically, FIG. 8 shows TH-MM moving at surface to the right. Model tests have demonstrated it will easily penetrate a large broken, or unbroken steep wave, of a height several times the hulls length, and emerge smoothly on the other side of the wave. In FIG. 8 there is shown penetration against steep wave 172 across subsurface path 174, smoothly emerging to surface along path 176, on the other side of the wave. A similar maneuver can be made against the next wave. Penetration is accomplished with a mild "dive" command neutralized and followed by a mild climb command for trajectory 174, which in fact the model reputedly performed with great ease under head ocean waves such as shown in FIG. 8, and larger, even though visibility for the remote control pilot was not available along path 114, trim being set by estimated time intervals only.

Another important benefit of TH-MM its ability to travel at surface for full visibility for to pilot, as shown in FIG. 8B, maintaining its distance ahead of pursuing worse-case broken wave 178. Moreover, the flat stern shape of stern of Th-MM permits stoppage of FIG. 8B with broken wave 178 passing over 170 without serious disturbance, as the broken wave having reduced mass due to air content encounters only a very slippery body of significant mass.

Other tests performed with TH-MM are diagonal surfing of a steep wave such as face of wave 172 in FIG. 8A, precisely as a surfer would, in which case very high speeds are reached which allow model if need be, to descend and to surge ahead of the steep wave under power and advance towards the beach, or turn around sharply and dive below the wave it was surfing on.

11. Video Tapes of Experimental Work on TH-MM.

All the statements pertaining the model behavior at surface, submerged, and in waves and surf have been video recorded and are available to demonstrate to the patent office the unique features of TH-MM.

I claim:

1. A surface and subsurface operational watercraft capable of resting stationary at bottom of a water body having an elongated body with a midbody region, a forward end which is approximately wedge-shaped in planview with its narrow end forward, and a rearward end which is approximately wedge-shaped in profile view with its narrow end rearward, said elongated body further characterized in having a height in side view adjacent said forward ends which is substantially less than the width of said elongated body adjacent said rearward end, with a midbody height in side view which is substantially larger than the height in side view adjacent said forward end an overall streamlined surface envelope of said elongated body with a total body volume; a primary interior dry volume having a structural midbody portion capable of supporting external water pressures when submerged; and a secondary interior volume which is adapted to be flooded for stationary resting at the bottom of said water body with equal water pressure between water outside and inside said secondary interior volume.

2. A surface and subsurface operational watercraft having an elongated body with a forward end and a rearward end, said watercraft being further characterized in having:

a weight and a power means;

said elongated body having a planform which is generally triangular with a narrow end forward and a broader portion adjacent said stern with said elongated body when floating in static water having a first submerged volume with a profile in side view which is generally a long triangle with base adjacent said forward end and a narrow end adjacent said rearward end;

said elongated body having right and left lateral wings;

said watercraft being capable of operating in, at and below the surface of water;

said first submerged volume generating an upward buoyant force equal to the weight of said watercraft, with said elongated body having a second volume above said first volume sufficient to permit surface operation of said watercraft with a significant positive reserve buoyancy margin;

said watercraft being capable of moving forward in water under the action of said power means in an efficient and sustained manner;

said wings being at least partially submerged when said watercraft is operating at the surface of water at a dive speed;

said wings at said dive speed operative to generate a downward hydrodynamic force sufficient to overcome the upward buoyant force of said positive reserve buoyancy margin when submerged;

said wings at a submerged speed operative to generate a downward hydrodynamic force sufficient to counter the lifting forces generated by said second volume when submerged;

said stern has a broad beam in planview forming the trailing edge of said elongated body;

with the combined profile shape of said first and second volumes adjacent said rearward end tapered in side view smoothly in a rearward direction with upper and lower surface portions meeting at said rearward end;

with a movable flap mounted on said rearward end, adapted to be moved downwards to selectively dive said watercraft and pitch down said watercraft, and upwards to selectively climb towards the water surface and pitch up said watercraft.

3. The watercraft of claim 2 wherein said wings are adapted to move with their trailing edge upwards to submerge said watercraft at said dive speed and retain the submerged condition at a submerged speed.

4. The watercraft of claim 2 in which said wings have movable trailing edge flaps which are adapted to move upwards to generate a downward hydrodynamic force and downwards to generate a lifting force.

5. The watercraft of claim 2 in which the span of said flap is approximately equal to the beam at the rearward end of said elongated body.

6. The watercraft of claim 5 with the chord of said flap being no less than approximately 2.5% of the length of said elongated body.

7. The watercraft of claim 2 in which said trailing edge flaps and said wings are adapted to be moved in coordinated fashion to accomplish pitch and path control, with the trailing edge of said flap moving in opposite direction to the trailing edges of said wings.

8. The watercraft of claim 2 in which the trailing edge of said flap and said wings are adapted to be moved in the same direction to accomplish changes in heave.

9. A surface and subsurface operational watercraft having a elongated body with a forward and a rearward end, said watercraft being further characterized in having:

a weight and a power means;

said elongated body having a planform which is generally triangular with a narrow end forward and a broader portion adjacent said stern with said elongated body when floating in static water having a first submerged volume with a profile in side view which is generally a long triangle with base adjacent said forward end and a narrow end adjacent said rearward end;

said elongated body having right and left lateral wings;

said watercraft being capable of operating in, at and below the surface of water;

said first submerged volume generating an upward buoyant force equal to the weight of said watercraft, with said elongated body having a second volume above said first volume sufficient to permit surface operation of said watercraft with a significant positive reserve buoyancy margin;

said watercraft being capable of moving forward in water under the action of said power means in an efficient and sustained manner;

said wings being at least partially submerged when said watercraft is operating at the surface of water at a dive speed;

said wings at said dive speed operative to generate a downward hydrodynamic force sufficient to overcome the upward buoyant force of said positive reserve buoyancy margin when submerged;

said wings at a submerged speed operative to generate a downward hydrodynamic force sufficient to counter the lifting forces generated by said second volume when submerged with the area of said wings ($S_w$) is no less than the area obtained by dividing the buoyant force ($L_{br}$) generated by said second volume when submerged, by the product of the dynamic water pressure q. at said submerged speed times a non-dimensional lift coefficient $C_L$ whence $S_w = L_{br}/C_L q$ with $C_L$ values no less than approximately 0.3 and no greater than approximately 1.5 for unflapped wings, and no greater than 2.5 for flapped wings.

10. A surface and subsurface operational watercraft comprising:

a watercraft hull including;

a generally triangular water-engaging section including a pointed bow, horizontally extended stern and generally straight side walls extending divergently from said bow to said stern;

a generally pyramidal surface section atop said water engaging section having left and right forward wall sections each respectively extending from and engaging the upper edges of one of said side walls and a rear wall section extending upwards from said stern;

at least two attitude-adjustable water-engaging wings each mounted on and extending outwards from a respective one of said side walls of said water-engaging section, said wings operative to control submersion of said watercraft during movement of said watercraft via attitude adjustment thereof; and said elongated body having an upper body portion above water level when operating at surface, said upper body portion having an approximately triangular base planform adjacent said generally triangular water engaging section in planform with a forward end; and with generally straight sides free of shoulder curvatures extending divergently from said bow to said stern, with a stern beam substantially larger than a midbody beam, and an approximately triangular profile in side view extending from a location adjacent said forward end to a location adjacent said stern beam substantially free of step discontinuities therebetween.

11. The watercraft of claim 10 wherein said triangular profile in side view is modified to be polygonal above the water plane, with the principal surfaces of said upper body portion being faceted between planview and profile.

12. The watercraft of claim 10 wherein said triangular profile in side view is modified to be polygonal above the water plane, with the principal surfaces of said upper body portion being faceted between planview and profile.

* * * * *